May 3, 1927.
J. H. HAYNES
1,627,507
RUNNER FOR AUTOMOBILE WHEELS
Filed May 18, 1926
3 Sheets-Sheet 2
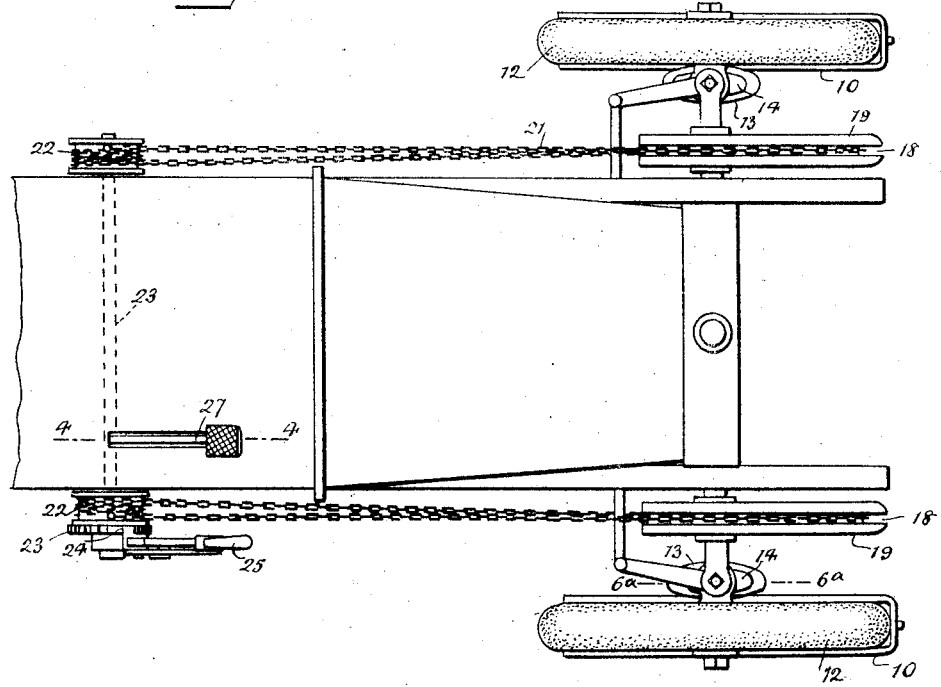
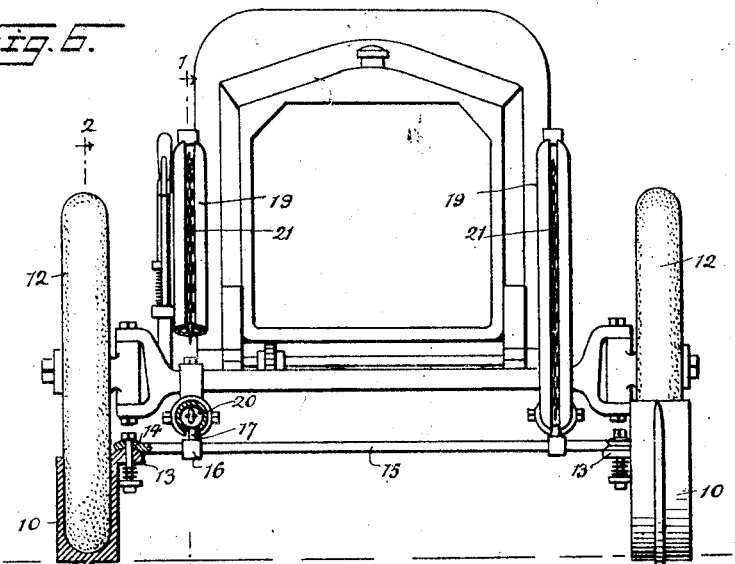
WITNESSES
H. J. Walker
Robert J. Hulsizer
INVENTOR
J. H. Haynes
BY Munn & Co
ATTORNEYS May 3, 1927.　　　　　　　　　　1,627,507
J. H. HAYNES
RUNNER FOR AUTOMOBILE WHEELS
Filed May 18, 1926　　　　3 Sheets-Sheet 3
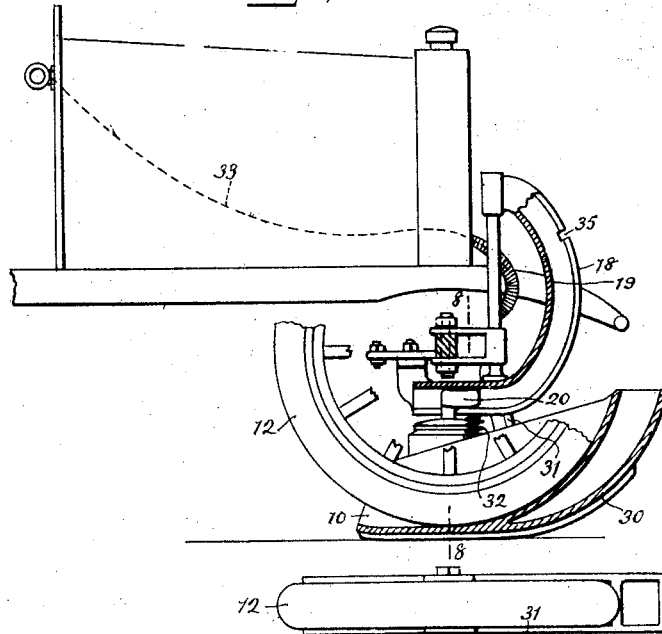
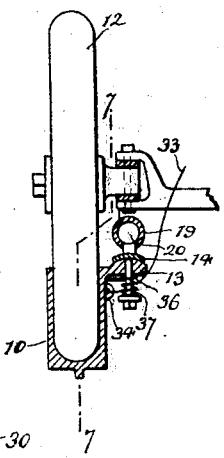
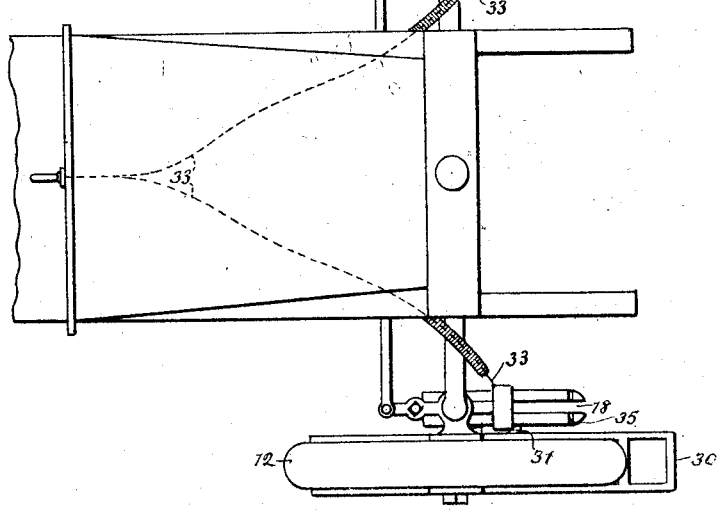
WITNESSES
INVENTOR
J. H. Haynes
BY
ATTORNEYS Patented May 3, 1927.

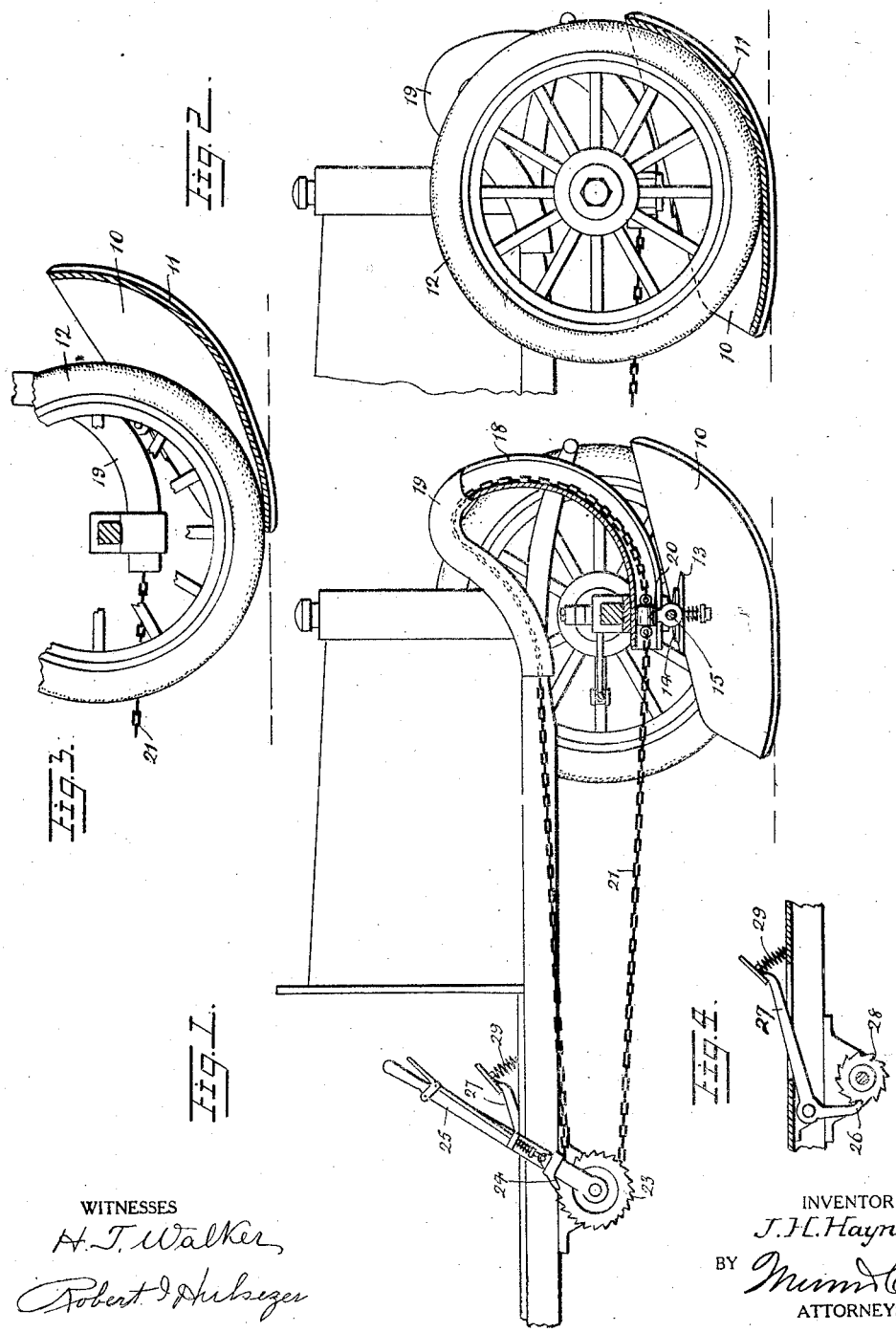

1,627,507

UNITED STATES PATENT OFFICE.

JASPER H. HAYNES, OF BANGOR, MAINE.

RUNNER FOR AUTOMOBILE WHEELS.

Application filed May 18, 1926. Serial No. 109,955.

This invention relates to a runner for automobile wheels and to means for operating the same.

An object of the invention is to provide a runner of such construction and so operated that without leaving his seat the driver of the car can move the runner under the wheel when it is desired to drive over snowy surface and can as easily remove the runner from the wheel.

The invention is illustrated in the drawings, of which—

Figure 1 is a side elevation partly in section of the shoe or runner in position on the wheel and showing the operating device.

Figure 2 is a similar view taken from the outside of the wheel;

Figure 3 is a section through the wheel showing the runner in position about to be either removed or applied;

Figure 4 is a section through a portion of the operating mechanism;

Figure 5 is a plan view of the front portion of the machine;

Figure 6 is a front view of certain parts in section;

Figure 6ᴬ is a sectional detail showing the manner of attaching the runners to the cross bar 15.

Figure 7 is a side elevation partly in section, in a modified form;

Figure 8 is a transverse section taken on the line 8—8 of Figure 7;

Figure 9 is a plan view of a modified form.

The form of the invention shown in the drawings is a preferred form, although it is understood that modifications in the construction and arrangement of the parts and in the character of the materials used may be adopted without departing from the spirit of the invention as set forth in the appended claims.

In its general aspect the invention concerns the mounting of a runner or shoe for traveling over snow and ice, one of these being mounted in front above each wheel and so associated with a track or guiding means that by the manipulation of mechanism adjacent the driver's seat these runners can be moved downward either by gravity or positively to a point directly in front of the wheels, whereupon the wheels can be driven up on the runners and thereafter will rest thereon, using the runner as a shoe.

In removing the runners it is merely necessary to back the car a little in order to move the wheels until the weight of the car is resting on the ground, after which the operating mechanism can be manipulated to move the shoes upwardly in their tracks to their normal inoperative position.

The invention therefore contemplates the provision of means whereby the shoes can be dropped by gravity and held in their normal inoperative position by suitable automatic latching means.

In the preferred form of the invention shown in the drawings I provide, in connection with each front wheel a shoe or runner 10 having a tread portion 11 conforming substantially to the curvature of the tire 12. This runner or shoe is provided with a lateral projecting ear 13 having a curved upper surface adapted to be seated in a similarly curved end portion 14 on the end of a carrier bar 15. The bar 15 is provided with leg portions 16 having necks 17 projecting through slots 18 in curved tubular members or tracks 19. These legs are also provided with head portions 20 which fit firmly and snugly within the tracks. To the heads on each side thereof is connected a chain 21 which passes over a suitable drum 22 mounted on a shaft 23 near the driver's seat. This shaft is operated by means of a ratchet gear 23 and a pawl 24 mounted on an operating lever 25. The shaft is locked in any definite position by means of a locking pawl 26 held normally in engagement with the locking ratchet 28 by means of a spring 29. When the parts are in the position shown in Figure 1 the wheel is resting on the bottom of the runner and the propulsion of the rear wheel causes the runner to slide over the ice or snow.

When it is desired to remove the runner the pedal 27 is depressed to release or unlock the shaft 23, whereupon the car is backed a little to permit the wheels to shove the runner forward to the position shown in Figure 3, whereupon the lever 25 is operated to draw the runner upward to the top of the tubular track 19 where the runners will be held in an inoperative position. When it is desired to replace the runners again the shaft is released and the runners will either drop by gravity or can be moved down positively, if desired, by a suitable mechanism not shown.

In the modified form of runners shown in Figures 7, 8 and 9 the runner 30 more closely conforms to the shape of the tire. Furthermore, the construction in this case provides the lateral extension 13 with the head 20 in the track 19. However, in this case the runner is provided with a latching stem 31 which bears against the front face of the track, and a spring 32 which tends to push the rear end of the runner away from the track and hold the stem 31 against the front face of the track.

With the parts as shown in Figure 7 the runner is in full position on the wheel. To remove the runner it is necessary as before to back the car a little after which a pull is exerted through the wires 33 leading to each runner, these wires being connected to eyes 34 which will pull the runners and the head 20 upward along the track until the stem 31 projects into the groove 34 on the front of the track. The latching stem will be held in this groove by reason of the spring 32, which, by forcing the rear end of the runner away from the track tends to hold the front end of the runner toward the track. When it is desired to apply the shoes to the wheels again it is merely necessary to pull on the wire 33 which will exert a pull through the eyes 34 to compress the spring, drawing the rear end of the runner close to the track and thereby pulling the stem 31 out of the groove 35, allowing the runners to drop by gravity into a position substantially as shown in Figure 3, after which the car can be moved forward a little to cause the wheel to ride on to the runner, into the position shown in Figure 7.

In each modification the end of the carrier bar 15 is provided with a bolt 36 on the lower end of which a spring 37 is mounted to permit relative movement between the extension 13 and the end 14 of the bar.

What I claim is:

1. In combination with an automotive vehicle having a front wheel, a tubular track associated with the front wheel, a runner associated with the track and means operated from the driver's seat and connected to the runner and the track for moving the runner in the track to apply it and to remove it from the wheel.

2. In combination with an automotive vehicle a curved tubular track associated therewith at the front, a snow shoe or runner mounted for sliding movement in association with the track, means for moving the runner upward along the track to an inoperative position, said track having a groove near its upper end, a stem on the runner adapted to project into the groove to hold the runner in its inoperative position and a spring at the rear portion of the runner adapted to force and hold the stem in the groove and means extending from the runner to a point adjacent the driver's seat to move the runner against the action of the spring and remove the stem from the groove, whereby the runner can drop by gravity to a point in front of the wheel ready for association therewith.

JASPER H. HAYNES.